US012771407B2

(12) United States Patent
Meyer et al.

(10) Patent No.: US 12,771,407 B2
(45) Date of Patent: Oct. 20, 2026

(54) DISTRIBUTED CONFIGURATION OF RECONFIGURABLE INTELLIGENT SURFACES

(71) Applicant: Apple Inc., Cupertino, CA (US)

(72) Inventors: Stefan Meyer, Hoechstadt (DE); Jan K Ellenbeck, Gruenwald (DE); Bertram R Gunzelmann, Koenigsbrunn (DE)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 18/465,929

(22) Filed: Sep. 12, 2023

(65) Prior Publication Data

US 2024/0097745 A1 Mar. 21, 2024

Related U.S. Application Data

(60) Provisional application No. 63/407,011, filed on Sep. 15, 2022.

(51) Int. Cl.

| | |
|---|---|
| ***H04B 7/04*** | (2017.01) |
| ***H01Q 3/36*** | (2006.01) |
| ***H01Q 3/46*** | (2006.01) |
| ***H01Q 21/00*** | (2006.01) |

(52) U.S. Cl.

CPC ........... *H04B 7/04013* (2023.05); *H01Q 3/46* (2013.01)

(58) Field of Classification Search

CPC ........ H04B 7/04013; H01Q 3/46; H01Q 3/36; H01Q 21/0037

See application file for complete search history.

(56) References Cited

U.S. PATENT DOCUMENTS

| | | | | |
|---|---|---|---|---|
| 11,546,022 | B2 | 1/2023 | Dunna et al. | |
| 2014/0030994 | A1* | 1/2014 | Barak ................ | H01Q 21/0025 455/245.1 |
| 2016/0081006 | A1* | 3/2016 | Reisslein ................ | H04L 45/66 370/329 |
| 2023/0058998 | A1 | 2/2023 | Gunzelmann et al. | |
| 2023/0239814 | A1 | 7/2023 | Jung et al. | |

(Continued)

FOREIGN PATENT DOCUMENTS

| | | |
|---|---|---|
| CN | 112187323 A | 1/2021 |
| CN | 116112045 A | 5/2023 |

(Continued)

*Primary Examiner* — Harry H Kim

(74) *Attorney, Agent, or Firm* — Treyz Law Group, P.C.; Michael H. Lyons

(57) ABSTRACT

A system may include an access point (AP), a user equipment (UE) device, and a reconfigurable intelligent surface (RIS). The RIS may have antenna elements and phase shifters programmed using phase settings to form signal beams. The AP may calculate a first portion of the phase settings and may transmit the first portion to the RIS. The RIS may include a first processor that generates a second portion of the phase settings. The RIS may include a second processor coupled to the first processor over a bus. The second processor may generate the phase settings based on the second portion. The second processor may distribute the phase settings to the phase shifters. By distributing calculation of the phase settings between the AP and the RIS, power consumption of the system may be minimized while also minimizing the time required to re-configure the beams of the RIS.

20 Claims, 8 Drawing Sheets

(56) References Cited

U.S. PATENT DOCUMENTS

| | | | | |
|---|---|---|---|---|
| 2023/0379935 | A1* | 11/2023 | Li | H04B 7/0695 |
| 2024/0048188 | A1* | 2/2024 | Elshafie | H04B 7/04026 |
| 2024/0097745 | A1* | 3/2024 | Meyer | H01Q 3/36 |
| 2025/0343552 | A1* | 11/2025 | Ek | H03L 7/099 |

FOREIGN PATENT DOCUMENTS

| | | | |
|---|---|---|---|
| CN | 116527174 | A | 8/2023 |
| WO | 2022236684 | A1 | 11/2022 |
| WO | 2023056579 | A1 | 4/2023 |
| WO | 2023063721 | A1 | 4/2023 |
| WO | 2023070241 | A1 | 5/2023 |
| WO | 2023135822 | A1 | 7/2023 |
| WO | 2023156029 | A1 | 8/2023 |
| WO | 2023165406 | A1 | 9/2023 |

* cited by examiner

DISTRIBUTED CONFIGURATION OF RECONFIGURABLE INTELLIGENT SURFACES

This application claims the benefit of U.S. Provisional Patent Application No. 63/407,011, filed Sep. 15, 2022, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The wireless circuitry is used to perform communications using radio-frequency signals conveyed by the antennas.

As software applications on electronic devices become more data-intensive over time, demand has grown for electronic devices that support wireless communications at higher data rates. However, the maximum data rate supported by electronic devices is limited by the frequency of the radio-frequency signals. As the frequency of the radio-frequency signals increases, it can become increasingly difficult to perform satisfactory wireless communications because the signals become subject to significant over-the-air attenuation and typically require line-of-sight.

SUMMARY

A communication system may include a wireless access point (AP), a user equipment (UE) device, and a reconfigurable intelligent surface (RIS). The RIS may have antenna elements and phase shifters coupled to the antenna elements. The phase shifters may be programmed using different phase settings that configure the antenna elements to form different signal beams for redirecting (e.g., reflecting) wireless signals between the AP and the UE device at different locations.

The AP may calculate a first portion of the phase settings (e.g., first portion of a calculation of the phase settings). For example, the AP may select a signal beam for the RIS based on information about the UE device. The first portion of the phase settings may include one or more angles of the signal beam and/or a portion of a codebook entry for a codebook on the RIS. The AP may transmit a control signal to the RIS that identifies or includes the first portion of the phase setting.

The RIS may include a first processor such as a digital signal processor. The first processor may generate a second portion of the phase settings (e.g., a second portion of the calculation of the phase settings) based on the first portion of the phase settings. The second portion of the phase settings may include, for example, base values and phase offset values for use be different sets of the antenna elements. The RIS may include a second processor such as a hardware state machine. The second processor may be coupled to the first processor over a bus system. The second processor may generate the phase settings (e.g., by generating or completing a third portion of the phase settings) based on the second portion of the phase settings. The second processor may distribute the phase settings to the corresponding phase shifters over the bus system. By distributing calculation of the phase settings between the AP and the RIS, power consumption of the system may be minimized while also minimizing the time required to configure and re-configure the signal beams of the RIS.

An aspect of the disclosure provides a first electronic device configured to reflect wireless signals between a second electronic device and a third electronic device. The first electronic device can include a first set of antenna elements. The first electronic device can include first phase shifters coupled to the first set of antenna elements. The first electronic device can include a first processor configured to generate a first value. The first electronic device can include a bus system. The first electronic device can include a second processor coupled to the first processor and the first phase shifters over the bus system, the second processor being configured to generate, based on the first value, first phase settings, and configure the first phase shifters using the first phase settings.

An aspect of the disclosure provides a method of using a first electronic device to communicate with a second electronic device via a reconfigurable intelligent surface (RIS). The method can include with one or more processors, selecting, based on information associated with the second electronic device, a signal beam formable by the RIS. The method can include with the one or more processors, performing a portion of a calculation of a phase setting for antenna elements on the RIS, the antenna elements being configured to form the selected signal beam when programmed using the phase setting. The method can include transmitting, to the RIS, a control signal that identifies the portion of the calculation of the phase setting, one or more additional processors on the RIS being configured to complete the calculation of the phase setting. The method can include with a phased antenna array, while the antenna elements are configured using the phase setting, transmitting the wireless signals to the second electronic device via reflection off the RIS.

An aspect of the disclosure provides a method of operating a reconfigurable intelligent surface (RIS). The method can include receiving, from a first electronic device, a first portion of a phase setting for antenna elements on the RIS. The method can include with a first processor, generating a second portion of the phase setting for the antenna elements. The method can include with the first processor, configuring the antenna elements using the phase setting. The method can include with the antenna elements, reflecting wireless signals between the first electronic device and a second electronic device while the antenna elements are configured using the phase setting.

DETAILED DESCRIPTION

Figure 1:
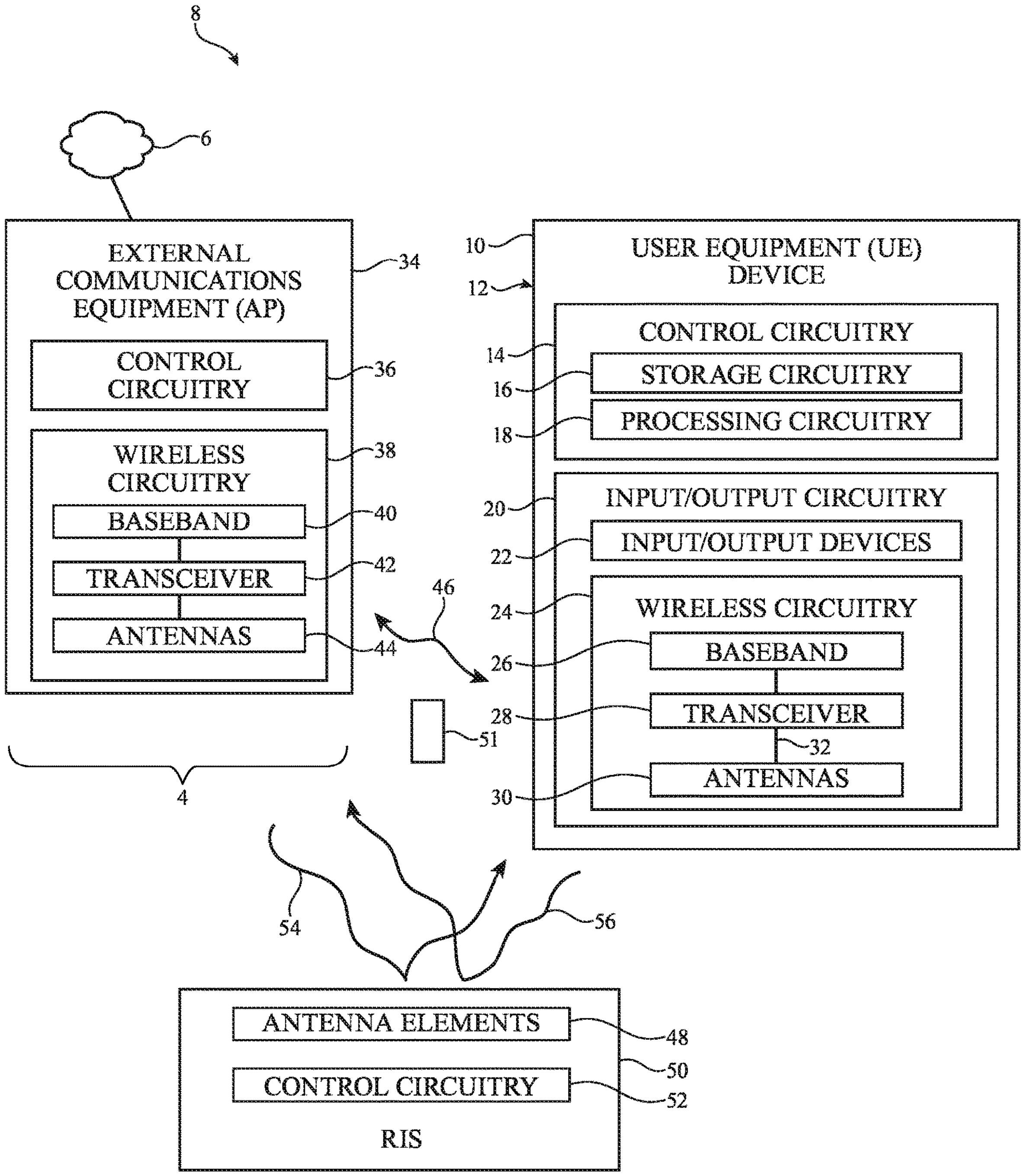
FIG. 1 is a schematic block diagram of an illustrative communications system having a user equipment (UE) device, external communications equipment, and a reconfigurable intelligent surface (RIS) in accordance with some embodiments.

FIG. 1 is a schematic diagram of an illustrative communications system 8 (sometimes referred to herein as communications network 8) for conveying wireless data between communications terminals. Communications system 8 may include network nodes (e.g., communications terminals). The network nodes may include user equipment (UE) such as one or more UE devices 10. The network nodes may also include external communications equipment (e.g., communications equipment other than UE devices 10) such as external communications equipment 34. External communications equipment 34 (sometimes referred to herein simply as external equipment 34) may include one or more electronic devices and may be a wireless base station, wireless access point, or other wireless equipment for example. An implementation in which external communications equipment 34 forms a wireless access point (AP) is described herein as an example. External communications equipment 34 may therefore sometimes be referred to herein as AP 34. UE device 10 and AP 34 may communicate with each other using one or more wireless communications links. If desired, UE devices 10 may wirelessly communicate with AP 34 without passing communications through any other intervening network nodes in communications system 8 (e.g., UE devices 10 may communicate directly with AP 34 over-the-air).

AP 34 may be communicably coupled to one or more other network nodes 6 in a larger communications network 4 via wired and/or wireless links Network 4 may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. Network 4 may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. UE devices 10 may send data to and/or may receive data from other nodes or terminals in network 4 via AP 34 (e.g., AP 34 may serve as an interface between user equipment devices 10 and the rest of the larger communications network). Network 4 may be managed, operated, controlled, or run by a corresponding network service provider (e.g., a cellular network carrier).

User equipment (UE) device 10 of FIG. 1 is an electronic device (sometimes referred to herein as electronic device 10 or device 10) and may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

As shown in the functional block diagram of FIG. 1, UE device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

UE device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols, THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

UE device 10 may include input-output circuitry 20. Input-output circuitry 20 may include input-output devices 22. Input-output devices 22 may be used to allow data to be supplied to UE device 10 and to allow data to be provided from UE device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to UE device 10 using wired or wireless connections (e.g., some of input-output devices 22 may be peripherals that are coupled to a main processing unit or other portion of UE device 10 via a wired or wireless link).

Input-output circuitry 20 may include wireless circuitry 24 to support wireless communications. Wireless circuitry 24 (sometimes referred to herein as wireless communications circuitry 24) may include baseband circuitry such as baseband circuitry 26 (e.g., one or more baseband processors and/or other circuitry that operates at baseband), radio-frequency (RF) transceiver circuitry such as transceiver 28, and one or more antennas 30. If desired, wireless circuitry 24 may include multiple antennas 30 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband data paths. Transceiver 28 may be coupled to antennas 30 over one or more radio-frequency transmission line paths 32. If desired, radio-frequency front end circuitry may be disposed on radio-frequency transmission line path(s) 32 between transceiver 28 and antennas 30.

In the example of FIG. 1, wireless circuitry 24 is illustrated as including only a single transceiver 28 and a single radio-frequency transmission line path 32 for the sake of clarity. In general, wireless circuitry 24 may include any desired number of transceivers 28, any desired number of radio-frequency transmission line paths 32, and any desired number of antennas 30. Each transceiver 28 may be coupled to one or more antennas 30 over respective radio-frequency transmission line paths 32. Radio-frequency transmission line path 32 may be coupled to antenna feeds on one or more antenna 30. Each antenna feed may, for example, include a positive antenna feed terminal and a ground antenna feed terminal. Radio-frequency transmission line path 32 may have a positive transmission line signal path that is coupled to the positive antenna feed terminal and may have a ground transmission line signal path that is coupled to the ground antenna feed terminal. This example is merely illustrative and, in general, antennas 30 may be fed using any desired antenna feeding scheme.

Radio-frequency transmission line path 32 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 32 may be integrated into rigid and/or flexible printed circuit boards. In one embodiment, radio-frequency transmission line paths such as radio-frequency transmission line path 32 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband circuitry 26 may provide baseband signals to transceiver 28 (e.g., baseband signals that include wireless data for transmission). Transceiver 28 may include circuitry for converting the baseband signals received from baseband circuitry 26 into corresponding radio-frequency signals (e.g., for modulating the wireless data onto one or more carriers for transmission, synthesizing a transmit signal, etc.). For example, transceiver 28 may include mixer circuitry for up-converting the baseband signals to radio frequencies prior to transmission over antennas 30. Transceiver 28 may also include digital to analog converter (DAC) and/or analog to digital converter (ADC) circuitry for converting signals between digital and analog domains. Transceiver 28 may transmit the radio-frequency signals over antennas 30 via radio-frequency transmission line path 32. Antennas 30 may transmit the radio-frequency signals to external wireless equipment by radiating the radio-frequency signals into free space.

In performing wireless reception, antennas 30 may receive radio-frequency signals from AP 34. The received radio-frequency signals may be conveyed to transceiver 28 via radio-frequency transmission line path 32. Transceiver 28 may include circuitry for converting the received radio-frequency signals into corresponding baseband signals. For example, transceiver 28 may include mixer circuitry for down-converting the received radio-frequency signals to baseband frequencies prior to conveying the baseband signals to baseband circuitry 26 and may include demodulation circuitry for demodulating wireless data from the received signals.

Front end circuitry disposed on radio-frequency transmission line path 32 may include radio-frequency front end components that operate on radio-frequency signals conveyed over radio-frequency transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in the front end circuitry may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 30 to the impedance of radio-frequency transmission line path 32), antenna tuning circuitry (e.g., networks of capacitors, resistors, inductors, and/or switches that adjust the frequency response of antennas 30), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 30.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14. Baseband circuitry 26 may, for example, access a communication protocol stack on control circuitry 14 (e.g., storage circuitry 16) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

The term "convey wireless signals" as used herein means the transmission and/or reception of the wireless signals (e.g., for performing unidirectional and/or bidirectional wireless communications with external wireless communications equipment). Antennas 30 may transmit the wireless signals by radiating the signals into free space (or to free space through intervening device structures such as a dielectric cover layer). Antennas 30 may additionally or alternatively receive the wireless signals from free space (e.g., through intervening devices structures such as a dielectric cover layer). The transmission and reception of wireless signals by antennas 30 each involve the excitation or resonance of antenna currents on an antenna resonating (radiating) element in the antenna by the wireless signals within the frequency band(s) of operation of the antenna.

Transceiver circuitry 26 may use antenna(s) 30 to transmit and/or receive wireless signals that convey wireless communications data between device 10 and AP 34 (e.g., one or more other devices such as device 10, a wireless access point or base station, etc.). The wireless communications data may be conveyed bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc.

Additionally or alternatively, wireless circuitry 24 may use antenna(s) 30 to perform wireless (radio-frequency) sensing operations. The sensing operations may allow device 10 to detect (e.g., sense or identify) the presence, location, orientation, and/or velocity (motion) of objects external to device 10. Control circuitry 14 may use the detected presence, location, orientation, and/or velocity of the external objects to perform any desired device operations. As examples, control circuitry 14 may use the detected presence, location, orientation, and/or velocity of the external objects to identify a corresponding user input for one or more software applications running on device 10 such as a gesture input performed by the user's hand(s) or other body parts or performed by an external stylus, gaming controller, head-mounted device, or other peripheral devices or accessories, to determine when one or more antennas 30 needs to be disabled or provided with a reduced maximum transmit power level (e.g., for satisfying regulatory limits on radio-frequency exposure), to determine how to steer (form) a radio-frequency signal beam produced by antennas 30 for wireless circuitry 24 (e.g., in scenarios where antennas 30 include a phased array of antennas 30), to map or model the environment around device 10 (e.g., to produce a software model of the room where device 10 is located for use by an augmented reality application, gaming application, map application, home design application, engineering application, etc.), to detect the presence of obstacles in the vicinity of (e.g., around) device 10 or in the direction of motion of the user of device 10, etc. The sensing operations may, for example, involve the transmission of sensing signals (e.g., radar waveforms), the receipt of corresponding reflected signals (e.g., the transmitted waveforms that have reflected off of external objects), and the processing of the transmitted signals and the received reflected signals (e.g., using a radar scheme).

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (1-R1) bands below 10 GHz, 5G New Radio Frequency Range 2 (1-R2) bands between 20 and 60 GHz, 6G bands at sub-THz or THz frequencies greater than about 100 GHz, etc.), other centimeter or millimeter wave frequency bands between 10-100 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-100 Gbps or higher, wireless circuitry 24 may convey wireless signals at frequencies greater than about 100 GHz.

As shown in FIG. 1, wireless circuitry 24 may transmit wireless signals 46 to AP 34 and/or may receive wireless signals 46 from AP 34. Wireless signals 46 may be tremendously high frequency (THF) signals (e.g., sub-THz or THz signals) at frequencies greater than around 100 GHz (e.g., between 100 GHz and 1 THz, between 80 GHz and 10 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, or within any desired sub-THz, THz, THF, or sub-millimeter frequency band such as a 6G frequency band), may be millimeter (mm) or centimeter (cm) wave signals between 10 GHz and around 70 GHz (e.g., 5G NR FR2 signals), or may be signals at frequencies less than 10 GHz (e.g., 5G NR FR1 signals, LTE signals, 3G signals, 2G signals, WLAN signals, Bluetooth signals, UWB signals, etc.). If desired, the high data rates supported by THF signals may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna 30 on a first chip in device 10 transmits THF signals 32 to another antenna 30 on a second chip in device 10), and/or to perform any other desired high data rate operations.

In implementations where wireless circuitry 24 conveys THF signals, wireless circuitry may include electro-optical circuitry if desired. The electro-optical circuitry may include light sources that generate first and second optical local oscillator (LO) signals. The first and second optical LO signals may be separated in frequency by the intended frequency of wireless signals 46. Wireless data may be modulated onto the first optical LO signal and one of the optical LO signals may be provided with an optical phase shift (e.g., to perform beamforming). The first and second optical LO signals may illuminate a photodiode that produces current at the frequency of wireless signals 46 when illuminated by the first and second optical LO signals. An antenna resonating element of a corresponding antenna 30 may convey the current produced by the photodiode and may radiate corresponding wireless signals 46. This is merely illustrative and, in general, wireless circuitry 24 may generate wireless signals 46 using any desired techniques.

Antennas 30 may be formed using any desired antenna structures. For example, antennas 30 may include antennas with resonating elements that are formed from loop antenna structures, patch antenna structures, inverted-F antenna structures, slot antenna structures, planar inverted-F antenna structures, helical antenna structures, monopole antennas, dipoles (e.g., planar dipole antennas such as bowtie antennas), hybrids of these designs, etc. Parasitic elements may be included in antennas 30 to adjust antenna performance.

If desired, two or more of antennas 30 may be integrated into a phased antenna array (sometimes referred to herein as a phased array antenna or an array of antenna elements). Each antenna 30 in the phased antenna array forms a respective antenna element of the phased antenna array. Each antenna 30 in the phased antenna array has a respective phase and magnitude controller that imparts the radio-frequency signals conveyed by that antenna with a respective phase and magnitude. The respective phases and magnitudes may be selected (e.g., by control circuitry 14) to configure the radio-frequency signals conveyed by the antennas 30 in the phased antenna array to constructively and destructively interfere in such a way that the radio-frequency signals collectively form a signal beam (e.g., a signal beam of wireless signals 46) oriented in a corresponding beam pointing direction (e.g., a direction of peak gain).

The control circuitry may adjust the phases and magnitudes to change (steer) the orientation of the signal beam (e.g., the beam pointing direction) to point in other directions over time. This process may sometimes also be referred to herein as beamforming. Beamforming may boost the gain of wireless signals 46 to help overcome over-the-air attenuation and the signal beam may be steered over time to point towards AP 34 even as the position and orientation of UE device 10 changes. The signal beams formed by antennas 30 of UE device 10 may sometimes be referred to herein as UE beams or UE signal beams Each UE beam may be oriented in a different respective direction (e.g., a beam pointing direction of peak signal gain). Each UE beam may be labeled by a corresponding UE beam index. UE device 10 may include or store a codebook (sometimes referred to herein as a UE codebook) that maps each of its UE beam indices to the corresponding phase and magnitude settings for each antenna 30 in a phased antenna array that configure the phased antenna array to form the UE beam associated with that UE beam index.

As shown in FIG. 1, AP 34 may also include control circuitry 36 (e.g., control circuitry having similar components and/or functionality as control circuitry 14 in UE device 10) and wireless circuitry 38 (e.g., wireless circuitry having similar components and/or functionality as wireless circuitry 24 in UE device 10). Wireless circuitry 38 may include baseband circuitry 40 and transceiver 42 (e.g., transceiver circuitry having similar components and/or functionality as transceiver circuitry 28 in UE device 10) coupled to two or more antennas 44 (e.g., antennas having similar components and/or functionality as antennas 30 in UE device 10). Antennas 44 may be arranged in one or more phased antenna arrays (e.g., phased antenna arrays that perform beamforming similar to phased antenna arrays of antennas 30 on UE device 10).

AP 34 may use wireless circuitry 38 to transmit a signal beam of wireless signals 46 to UE device 10 (e.g., as downlink (DL) signals transmitted in a downlink direction) and/or to receive a signal beam of wireless signals 46 transmitted by UE device 10 (e.g., as uplink (UL) signals transmitted in an uplink direction). The signal beams formed by antennas 44 of UE device 10 may sometimes be referred to herein as AP beams or AP signal beams Each AP beam may be oriented in a different respective direction (e.g., a beam pointing direction of peak signal gain). Each AP beam may be labeled by a corresponding AP beam index. AP 34 may include or store a codebook (sometimes referred to herein as an AP codebook) that maps each of its AP beam indices to the corresponding phase and magnitude settings for each antenna 44 in a phased antenna array that configure the phased antenna array to form the AP beam associated with that AP beam index.

While communications at high frequencies allow for extremely high data rates (e.g., greater than 100 Gbps), wireless signals 46 at such high frequencies are subject to significant attenuation during propagation over-the-air. Integrating antennas 30 and 44 into phased antenna arrays helps to counteract this attenuation by boosting the gain of the signals within a signal beam. However, signal beams are highly directive and may require a line-of-sight (LOS) between UE device 10 and AP 34. If an external object is present between AP 34 and UE device 10, the external object may block the LOS between UE device 10 and AP 34, which can disrupt wireless communications using wireless signals 46. If desired, an reconfigurable intelligent surface (RIS) may be used to allow UE device 10 and AP 34 to continue to communicate using wireless signals 46 even when an external object blocks the LOS between UE device 10 and AP 34 (or whenever direct over-the-air communications between AP 34 and UE device 10 otherwise exhibits less than optimal performance).

As shown in FIG. 1, system 8 may include one or more reconfigurable intelligent surfaces (RIS's) such as RIS 50. RIS 50 may sometimes also be referred to as an intelligent reconfigurable surface, an intelligent reflective/reflecting surface, a reflective intelligent surface, a reflective surface, a reflective device, a reconfigurable reflective device, a reconfigurable reflective surface, or a reconfigurable surface. AP 34 may be separated from UE device 10 by a line-of-sight (LOS) path. In some circumstances, an external object such as object 51 may block the LOS path. Object 51 may be, for example, part of a building such as a wall, window, floor, or ceiling (e.g., when UE device 10 is located inside), furniture, a body or body part, an animal, a cubicle wall, a vehicle, a landscape feature, or other obstacles or objects that may block the LOS path between AP 34 and UE device 10.

In the absence of external object 51, AP 34 may form a corresponding AP beam of wireless signals 46 oriented in the direction of UE device 10 and UE device 10 may form a corresponding UE beam of wireless signals 46 oriented in the direction of AP 34. UE device 10 and AP 34 can then convey wireless signals 46 over their respective signal beams and the LOS path. However, the presence of external object 51 prevents wireless signals 46 from being conveyed over the LOS path.

RIS 50 may be placed or disposed within system 8 in such a way so as to allow RIS 50 to reflect wireless signals 46 between UE device 10 and AP 34 despite the presence of external object 51 within the LOS path. More generally, RIS 50 may be used to reflect wireless signals 46 between UE device 10 and AP 34 when reflection via RIS 50 offers superior radio-frequency propagation conditions relative to the LOS path regardless of the presence of external object 51 (e.g., when the LOS path between AP 34 and RIS 50 and the LOS path between RIS 50 and UE device 10 exhibit superior propagation/channel conditions than the direct LOS path between UE device 10 and AP 34).

When RIS 50 is placed within system 8, AP 34 may transmit wireless signals 46 towards RIS 50 (e.g., within an AP beam oriented towards RIS 50 rather than towards UE device 10) and RIS 50 may reflect the wireless signals towards UE device 10, as shown by arrow 54. Conversely, UE device 10 may transmit wireless signals 46 towards RIS 50 (e.g., within a UE beam oriented towards RIS 50 rather than towards AP 34) and RIS 50 may reflect the wireless signals towards AP 34, as shown by arrow 56.

RIS 50 is an electronic device that includes a two-dimensional surface of engineered material (e.g., metal patches, metamaterials, etc.) having reconfigurable properties for performing (e.g., scattering/reflecting) communications between AP 34 and UE device 10. RIS 50 may include an array of reflective/scattering elements such as antenna elements 48 on an underlying substrate. Antenna elements 48 may also sometimes be referred to herein as reflective elements 48, reconfigurable antenna elements 48, reconfigurable reflective elements 48, scattering elements 48, reflectors 48, or reconfigurable reflectors 48.

The substrate may be a rigid or flexible printed circuit board, a package, a plastic substrate, meta-material, or any other desired substrate. The substrate may be planar or may be curved in one or more dimensions. If desired, the substrate and antenna elements 48 may be enclosed within a housing. The housing may be formed from materials that are transparent to wireless signals 46. If desired, RIS 50 may be disposed (e.g., layered) on an underlying electronic device. RIS 50 may also be provided with mounting structures (e.g., adhesive, brackets, a frame, screws, pins, clips, etc.) that can be used to affix or attach RIS 50 to an underlying structure such as another electronic device, a wall, the ceiling, the floor, furniture, etc. Disposing RIS 50 on a ceiling, wall, window, column, pillar, or at or adjacent to the corner of a room (e.g., a corner where two walls intersect, where a wall intersects with the floor or ceiling, where two walls and the floor intersect, or where two walls and the ceiling intersect), as examples, may be particularly helpful in allowing RIS 50 to reflect wireless signals between AP 34 and UE device 10 around various objects 51 that may be present (e.g., when AP 34 is located outside and UE device 10 is located inside, when AP 34 and UE device 10 are both located inside or outside, etc.).

RIS 50 may be a passive, adaptively controlled, reflecting surface and a powered device that includes control circuitry 52. Control circuitry 52 may help to control the operation of antenna elements 48 (e.g., one or more processors in control circuitry such as control circuitry 14). When electro-magnetic (EM) energy waves (e.g., waves of wireless signals 46) are incident on RIS 50, the wave is reflected by each antenna element 48 via re-radiation by each antenna element 48 with a respective phase and amplitude response. Antenna elements 48 may include passive reflectors (e.g., antenna resonating elements or other radio-frequency reflective elements). Each antenna element 48 may include an adjustable device that is programmed, set, and/or controlled by control circuitry 52 (e.g., using a control signal that includes a respective beamforming coefficient) to configure that antenna element 48 to reflect incident EM energy with the respective phase and amplitude response. The adjustable device may be a programmable photodiode, an adjustable impedance matching circuit, an adjustable phase shifter, an adjustable amplifier, a varactor diode, an antenna tuning circuit, etc.

Control circuitry 52 on RIS 50 may configure the reflective response of antenna elements 48 on a per-element or per-group-of-elements basis (e.g., where each antenna element has a respective programmed phase and amplitude response or the antenna elements in different sets/groups of antenna elements are each programmed to share the same respective phase and amplitude response across the set/group but with different phase and amplitude responses between sets/groups). The scattering, absorption, reflection, and diffraction properties of the entire RIS can therefore be changed over time and controlled (e.g., by software running on the RIS or other devices communicably coupled to the RIS such as external equipment 34 or UE device 10).

One way of achieving the per-element phase and amplitude response of antenna elements 48 is by adjusting the impedance of antenna elements 48, thereby controlling the complex reflection coefficient that determines the change in amplitude and phase of the re-radiated signal. The control circuitry 52 on RIS 50 may configure antenna elements 48 to exhibit impedances that serve to reflect wireless signals 46 incident from particular incident angles onto particular output angles. The antenna elements 48 (e.g., the antenna impedances) may be adjusted to change the angle with which incident wireless signals 46 are reflected off RIS 50.

For example, the control circuitry on RIS 50 may configure antenna elements 48 to reflect wireless signals 46 transmitted by AP 34 towards UE device 10 (as shown by arrow 54) and to reflect wireless signals 46 transmitted by UE device 10 towards AP 34 (as shown by arrow 56). In such an example, control circuitry 36 may configure (e.g., program) a phased antenna array of antennas 44 on AP 34 to form an AP beam oriented towards RIS 50, control circuitry 14 may configure (e.g., program) a phased antenna array of antennas 30 on UE device 10 to form a UE beam oriented towards RIS 50, control circuitry 52 may configure (e.g., program) antenna elements 48 to receive and re-radiate (e.g., effectively reflect) wireless signals incident from the direction of AP 34 towards/onto the direction of UE device 10 (as shown by arrow 54), and control circuitry 52 may configure (e.g., program) antenna elements 48 to receive and re-radiate (e.g., effectively reflect) wireless signals incident from the direction of UE device 10 towards-onto the direction of external equipment 34 (as shown by arrow 56). The antenna elements may be configured using respective beamforming coefficients. Control circuitry 52 on RIS 50 may set and adjust the adjustable devices coupled to antenna elements 48 (e.g., may set and adjust the impedances of antenna elements 48) over time to reflect wireless signals 46 incident from different selected incident angles onto different selected output angles.

To minimize the cost, complexity, and power consumption of RIS 50, RIS 50 may include only the components and control circuitry required to control and operate antenna elements 48 to reflect wireless signals 46. Such components and control circuitry may include, for example, the adjustable devices of antenna elements 48 as required to change the phase and magnitude responses of antenna elements 48 (based on corresponding beamforming coefficients) and thus the direction with which RIS 50 reflects wireless signals 46. The components may include, for example, components that adjust the impedances of antenna elements 48 so that each antenna element exhibits a respective complex reflection coefficient, which determines the phase and amplitude of the reflected (re-radiated) signal produced by each antenna element (e.g., such that the signals reflected across the array constructively and destructively interfere to form a reflected signal beam in a corresponding beam pointing direction).

All other components that would otherwise be present in UE device 10 or AP 34 may be omitted from RIS 50. For example, RIS 50 does not include baseband circuitry (e.g., baseband circuitry 26 or 40) and does not include transceiver circuitry (e.g., transceiver 42 or 28) coupled to antenna elements 48. Antenna elements 48 and RIS 50 therefore do not generate wireless data for transmission, do not synthesize radio-frequency signals for transmission, and do not receive and demodulate radio-frequency signals. RIS 50 may also be implemented without a display or user input device. In other words, the control circuitry on RIS 50 may adjust antenna elements 48 to direct and steer reflected wireless signals 46 without using antenna elements 48 to perform any data transmission or reception operations and without using antenna elements 48 to perform radio-frequency sensing operations.

This may serve to minimize the hardware cost and power consumption of RIS 50. If desired, RIS 50 may also include one or more antennas (e.g., antennas separate from the antenna elements 48 used to reflect wireless signals 46) and corresponding transceiver/baseband circuitry that uses the one or more antennas to convey control signals with AP 34 or UE device 10 (e.g., using a control channel plane and control RAT). Such control signals may be used to coordinate the operation of RIS 50 in conjunction with AP 34 and/or UE device 10 but requires much lower data rates and thus much fewer processing resources and much less power than transmitting or receiving wireless signals 46. These control signals may, for example, be transmitted by UE device 10 and/or AP 34 to configure the phase and magnitude responses of antenna elements 48 (e.g., the control signals may convey beamforming coefficients or information associated with beamforming coefficients). This may allow the calculation of phase and magnitude responses for antenna elements 48 to be offloaded from RIS 50, further reducing the processing resources and power required by RIS 50. In other implementations, RIS 50 may be a self-controlled RIS that includes processing circuitry for generating its own phase and magnitude responses and/or for coordinating communications among multiple UE devices (e.g., in an RIS-as-a-service configuration).

In this way, RIS 50 may help to relay wireless signals 46 between AP 34 and UE device 10 when object 51 blocks the LOS path between AP 34 and UE device 10 and/or when the propagation conditions from AP 34 to RIS 50 and from RIS 50 to UE device 10 are otherwise superior to the propagation conditions from AP 34 to UE device 10. Just a single RIS 50 may, for example, increase signal-to-interference-plus-noise ratio (SINR) for UE device 10 by as much as +20 dB and may increase effective channel rank relative to environments without an RIS. At the same time, RIS 50 only includes processing resources and consumes power required to perform control procedures, minimizing the cost of RIS 50 and maximizing the flexibility with which RIS 50 can be placed within the environment.

RIS 50 may include or store a codebook (sometimes referred to herein as a RIS codebook) that maps settings for antenna elements 48 (e.g., phase settings) to different signal beams (e.g., signal beams having corresponding orientation angles) formable by antenna elements 48 (sometimes referred to herein as RIS beams) RIS 50 may configure its antenna elements 48 to perform beamforming with respective beamforming coefficients (e.g., as given by the RIS codebook). The beamforming performed at RIS 50 may include two concurrently active RIS beams (e.g., where each RIS beam is generated using a corresponding set of beamforming coefficients).

In general, RIS 50 may relay (reflect) signals between two different devices. RIS 50 may form a first active RIS beam that has a beam pointing direction oriented towards the first device (sometimes referred to here as a RIS-AP beam when the first device is AP 34) and may concurrently form a second active RIS beam that has a beam pointing direction oriented towards the second device (sometimes referred to herein as a RIS-UE beam when the second device is UE device 10). In this way, when wireless signals 46 are incident from the first device (e.g., AP 34) within the first RIS beam, the antenna elements 48 on RIS 50 may receive the wireless signals incident from the direction the first device (e.g., AP 34) and may re-radiate (e.g., effectively reflect) the incident wireless signals within the second RIS beam and towards the direction of the second device (e.g., UE device 10). Conversely, when wireless signals 46 are incident from the second device (e.g., UE device 10) within the second RIS beam, the antenna elements 48 on RIS 50 may receive the wireless signals incident from the direction the second device (e.g., UE device 10) and may re-radiate (e.g., effectively reflect) the incident wireless signals within the first RIS beam and towards the direction of the first device (e.g., AP 34).

While referred to herein as "beams," the first RIS beam and the second RIS beams formed by RIS 50 do not include signals/data that are actively transmitted by RIS 50 but instead correspond to the impedance, phase, and/or magnitude response settings (e.g., reflection coefficients, impedances, etc.) for antenna elements 48 that shape the reflected signal beam of wireless signals 46 from a corresponding incident direction/angle onto a corresponding output direction/angle (e.g., the first RIS beam may be effectively formed using a first set of beamforming coefficients and the second RIS beam may be effectively formed using a second set of beamforming coefficients but are not associated with the active transmission of wireless signals by RIS 50).

Figure 2:
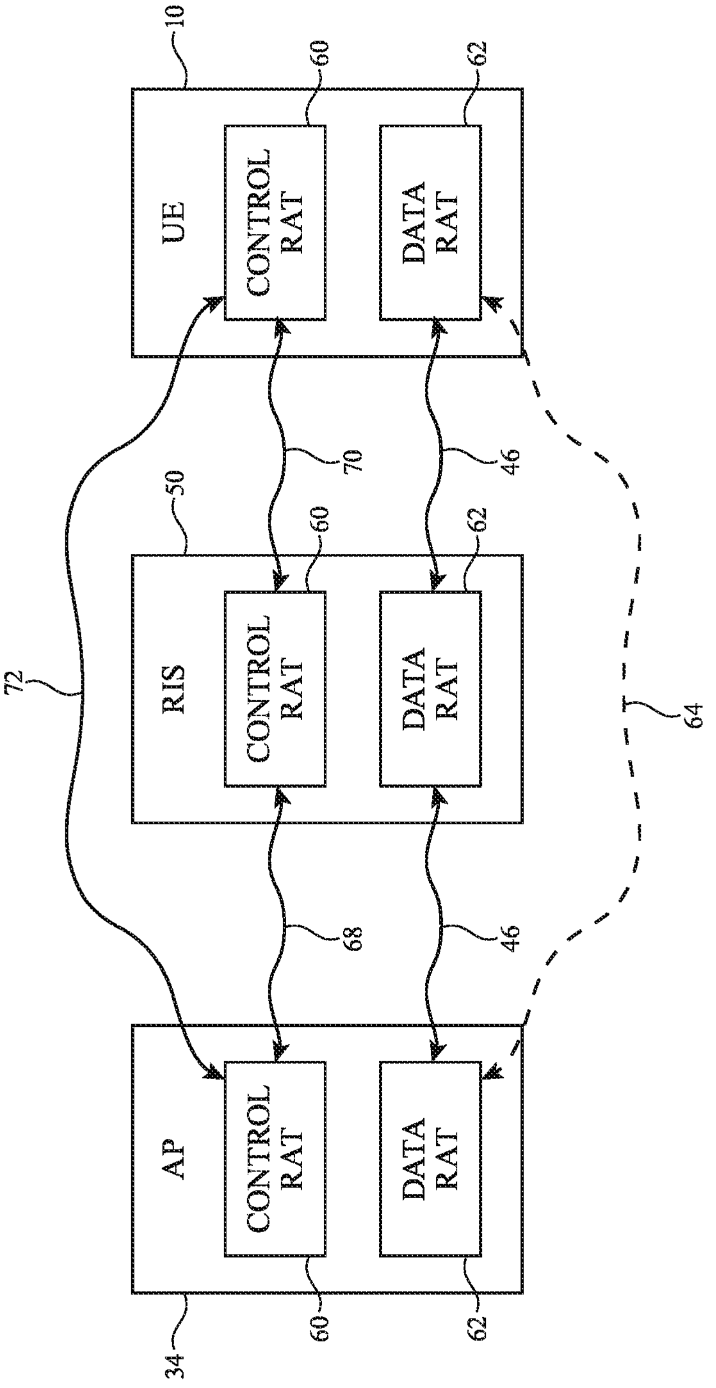
FIG. 2 is a diagram showing how an illustrative wireless access point, RIS, and user equipment device may communicate using both a data transfer radio access technology (RAT) and a control RAT in accordance with some embodiments.

FIG. 2 is a diagram showing how AP 34, RIS 50, and UE device 10 may communicate using both a control RAT and a data transfer RAT for establishing and maintaining communications between AP 34 and UE device 10 via RIS 50. As shown in FIG. 2, AP 34, RIS 50, and UE device 10 may each include wireless circuitry that operates according to a data transfer RAT 62 (sometimes referred to herein as data RAT 62) and a control RAT 60. Data RAT 62 may be a sub-THz communications RAT such as a 6G RAT that performs wireless communications at the frequencies of wireless signals 46. Control RAT 60 may be associated with wireless communications that consume much fewer resources and are less expensive to implement than the communications of data RAT 62. For example, control RAT 60 may be Wi-Fi, Bluetooth, a cellular telephone RAT such as a 3G, 4G, or 5G NR FR1 RAT, etc. As another example control RAT 60 may be an infrared communications RAT (e.g., where an infrared remote control or infrared emitters and sensors use infrared light to convey signals for the control RAT between UE device 10, AP 34, and/or RIS 50).

AP 34 and RIS 50 may use control RAT 60 to convey radio-frequency signals 68 (e.g., control signals) between AP 34 and RIS 50. UE device 10 and RIS 50 may use control RAT 60 to convey radio-frequency signals 70 (e.g., control signals) between UE device 10 and RIS 50. UE device 10, AP 34, and RIS 50 may use data RAT 62 to convey wireless signals 46 via reflection off antenna elements 48 of RIS 50. The wireless signals may be reflected, via the first RIS beam and the second RIS beam formed by RIS 50, between AP 34 and UE device 10. AP 34 may use radio-frequency signals 68 and control RAT 116 and/or UE device 10 may use radio-frequency signals 70 and control RAT 116 to discover RIS 50 and to configure antenna elements 48 to establish and maintain the relay of wireless signals 32 performed by antenna elements 48 using data RAT 62.

If desired, AP 34 and UE device 10 may also use control RAT 60 to convey radio-frequency signals 72 directly with each other (e.g., since the control RAT operates at lower frequencies that do not require line-of-sight). UE device 10 and AP 34 may use radio-frequency signals 72 to help establish and maintain THF communications (communications using data RAT 62) between UE device 10 and AP 34 via RIS 50. AP 34 and UE device 10 may also use data RAT 62 to convey wireless signals 46 directly (e.g., without reflection off RIS 50) when a LOS path is available.

If desired, the same control RAT 60 may be used to convey radio-frequency signals 68 between AP 34 and RIS 50 and to convey radio-frequency signals 70 between RIS 50 and UE device 10. If desired, AP 34, RIS 50, and/or UE device 10 may support multiple control RATs 60. In these scenarios, a first control RAT 60 (e.g., Bluetooth) may be used to convey radio-frequency signals 68 between AP 34 and RIS 50, a second control RAT 60 (e.g., Wi-Fi) may be used to convey radio-frequency signals 70 between RIS 50 and UE device 10, and/or a third control RAT 60 may be used to convey radio-frequency signals 72 between AP 34 and UE device 10. Processing procedures (e.g., work responsibilities) may be divided between data RAT 62 one or more control RAT 60 during discovery, initial configuration, data RAT communication between UE device 10 and AP 34 via RIS 50, and beam tracking of UE device 10.

Figure 3:
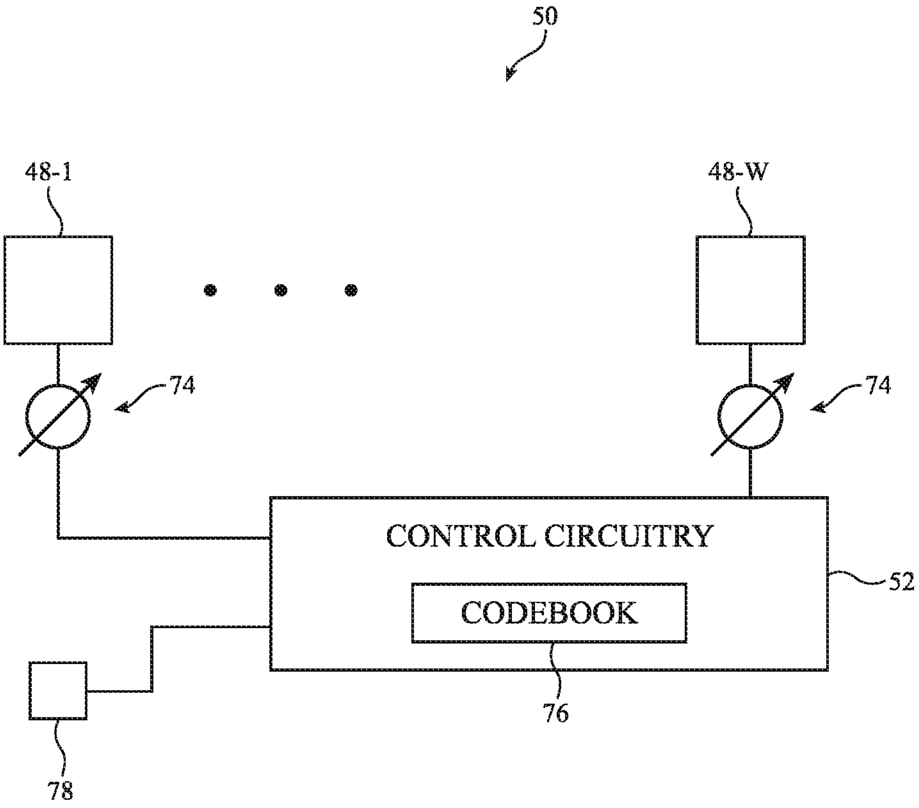
FIG. 3 is a diagram of an illustrative RIS in accordance with some embodiments.

FIG. 3 is a diagram of RIS 50. As shown in FIG. 3, RIS 50 may include a set of W antenna elements 48 (e.g., patches or other structures formed from metal or metamaterials on an underlying substrate). The W antenna elements 48 may be arranged in an array pattern (e.g., having sub-wavelength spacing). The array pattern may have rows and columns. Other array patterns may be used if desired. Each antenna element W may be coupled to a corresponding adjustable device 74. Adjustable devices 74 may include, as one example, a diode switch. Each adjustable device 74 and its corresponding antenna element 48 may sometimes be referred to herein as a unit cell of RIS 50 (e.g., RIS 50 may have W unit cells).

Control circuitry 52 may provide control signals (e.g., a variable voltage) to adjustable devices 74 that configure each adjustable device 74 to impart a selected impedance to its corresponding antenna element 48. The impedance may effectively impart a corresponding phase shift to incident THF signals that are scattered (e.g., re-radiated or effectively reflected) by the antenna element. Adjustable devices 74 may therefore sometimes be referred to herein as phase shifters 74. Control circuitry 52 may transmit control signals to phase shifters 74 to control each phase shifter 74 to exhibit a corresponding phase setting. Each phase setting may cause the antenna element 48 to impart a corresponding phase shift to the wireless signals 46 scattered (reflected) by the antenna element. Put differently, each phase setting may configure the corresponding antenna element 48 to exhibit a particular reflection coefficient or impedance for incident signals. By selecting the appropriate settings (phase shift settings or applied phase shifts) for phase shifters 74, the array of antenna elements 48 may be configured to form RIS beams in different directions (e.g., to reflect/scatter wireless signals incident from incident angles associated with a first RIS beam onto corresponding output angles associated with a second RIS beam).

As shown in FIG. 3, RIS 50 may have one or more antennas 78. Antenna(s) 78 may include one or more of the W antenna elements 48 or may be separate from the W antenna elements 48 on RIS 50. Antenna(s) 78 may be coupled to a transceiver on RIS 50 and may be used to convey control signals over the control RAT. Control circuitry 52 may transmit control signals using antenna(s) 78 and/or may receive control signals using antenna(s) 78.

Control circuitry 52 may store a codebook 76 that maps different sets of settings (e.g., phase settings) for phase shifters 74 to different input/output angles (e.g., to different combinations of first and second RIS beams for RIS 50). Codebook 76 may be populated during manufacture, deployment, calibration, and/or regular operation of RIS 50. If desired, AP 34 (FIG. 1) may use the control RAT to update the entries of codebook 76. During operation, RIS 50 may be controlled to configure (program) phase shifters 74 to form the RIS beams necessary for RIS 50 to reflect wireless signals 46 between the location of AP 34 and the location of UE device 10, which may change over time. This may involve selection (calculation) of the appropriate set of phase settings (e.g., imparted phase shifts) for phase shifters 74 to form the RIS beams.

During communications, AP 34 may select the RIS beams (e.g., a RIS-AP beam and a RIS-UE beam) for RIS 50 to form at any given time (e.g., to reflect signals from the AP towards the current location of UE device 10). AP 34 may, for example, have more awareness of than RIS 50 about the location of UE device 10 (e.g., AP 34 may track movements of UE device 10, may receive feedback signals and/or channel state information from UE device 10, etc.). If desired, AP 34 may calculate the phase settings (e.g., phase shift values) for each of the antenna elements 48 on RIS 50 to implement the selected RIS beams AP 34 may then use the control RAT to provide the calculated phase settings to RIS 50. However, calculating the phase settings entirely at AP 34 may maximize the latency with which RIS 50 is programmed and re-programmed as needed over time (e.g., as UE device 10 moves), especially given the large number of antenna elements 48 on RIS 50 (e.g., as many as tens of thousands of antenna elements) and the relatively low data rates supported by the control RAT. On the other hand, control circuitry 52 on RIS 50 may calculate the phase settings for each of the phase shifters 74 itself. However, RIS 50 may not have sufficient power or other resources to efficiently compute the phase settings entirely on its own, and has limited or no visibility on the current location of UE device 10.

To mitigate these issues and minimize the time required to program and re-program the antenna elements on RIS 50 (e.g., to as fast as a few MHz), the generation of the phase settings for RIS 50 may be split or divided between RIS 50 and AP 34 (e.g., RIS 50 and AP 34 may both perform some of the calculations/computations required to generate the phase settings for each of the antenna elements 48 on RIS 50). AP 34 may use the control RAT to transmit its portion of the calculations/computations to RIS 50, which then completes the calculations/computations of the phase settings based on the portion transmitted from AP 34. In addition, the calculation responsibilities on RIS 50 for the phase settings may be split or divided between a central processor and a set of local processors on RIS 50.

Figure 4:
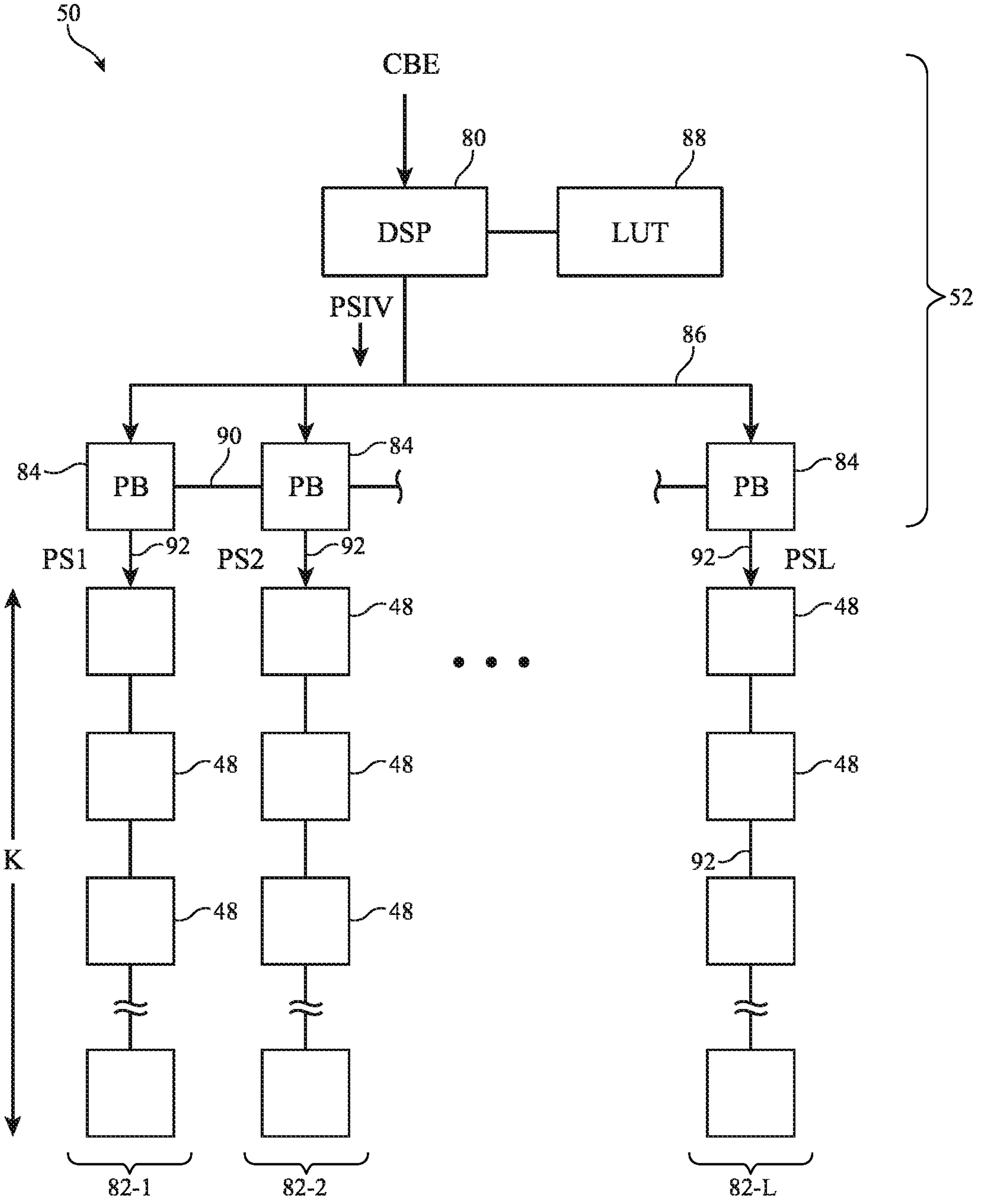
FIG. 4 is a diagram of an illustrative RIS having a central processor and local processors for programming sets of antenna elements in accordance with some embodiments.

FIG. 4 is a diagram showing how RIS 50 may include a central processor and a set of local processors for calculating phase settings for antenna elements 48 (sometimes referred to herein as phase shift settings or equivalently as phase shift values or phase shift settings, which characterize the phase shifts imparted by antenna elements 48 when configured using the phase shift settings). As shown in FIG. 4, control circuitry 52 on RIS 50 may include a first processor such as central processor 80, a set of other processors such as local processors 84, and storage such as look-up table (LUT) 88. Central processor 80 may be disposed at a first location on RIS 50 whereas local processors 84 are distributed across RIS 50. Central processor 80 may be coupled to each local processor 84 over control paths 86 (e.g., a first portion of a bus system such as a primary bus). Each local processor 84 may be coupled to a respective set 82 of antenna elements 48 over control paths 92 (e.g., a second portion of the bus system such as a secondary bus). Sets 82 may sometimes be referred to herein as final stages 82 or simply as stages 82.

Antenna elements 48 may be arranged in an array pattern. Each set 82 may, for example, form a respective one of L columns of the array (e.g., sets 82 may include a first set 82-1, a second set 82-2, an Lth set 82-L, etc.). Each set 82 may, for example, include K antenna elements 48 coupled to the same local processor 84 (e.g., RIS 50 may include W=K×L total antenna elements 48). If desired, local processors 84 may be coupled together by control paths 90 (e.g., portions of the primary bus or other control paths).

Central processor 80 may include a digital signal processor (DSP) or any other desired processing circuitry. LUT 88 may be coupled to central processor 80. Each local processor 84 may include a set of hardware processing blocks (PB) such as a hardware state machine, registers, buffers, calculators (e.g., hardwired digital logic gates such as adders, subtractors, multipliers, dividers, AND gates, OR gates, XOR gates, shifters, NOR gates, etc.), and/or any other desired processing circuitry. Local processors 84 may have fewer processing capabilities than central processor 80 (e.g., local processors 84 may be implemented without a DSP). Calculation of phase settings for each of the antenna elements 48 may be distributed between AP 34, central processor 80, and local processors 84.

For example, AP 34 may perform a first portion of the calculation for generating phase settings for antenna elements 48 (e.g., may calculate/compute a first portion of the phase settings). AP 34 may use the control RAT to transmit a control signal CBE to RIS 50 that identifies or includes the first portion of the phase settings performed by AP 34. RIS 50 may receive control signal CBE (e.g., using antenna 78 of FIG. 3), which is passed to central processor 80. Control signal CBE may include, for example, a codebook entry (e.g., for codebook 76 of FIG. 3), a reduced codebook entry (e.g., with a certain parameter range), information identifying a codebook entry or a portion of a codebook entry, information identifying the RIS beams to be formed by RIS 50 (e.g., geometric data such as vectors or angles for the incoming and outgoing RIS beams), a codeword describing settings for antenna elements 48 and/or phase shifters 74, and/or other information.

Central processor 80 may use control signal CBE and LUT 88 to generate a second portion of the calculation for generating phase settings for antenna elements 48 (e.g., central processor 80 may calculate/compute a second portion of the phase settings). The second portion of the phase settings may sometimes be referred to herein as intermediate values PSIV (e.g., intermediate calculation results for the phase settings of antenna elements 48). Intermediate values PSIV may also sometimes be referred to herein as base values. Central processor 80 may, for example, use LUT 88 to decode codebook entries identified by control signal CBE and/or to calculate basic settings for the phase shifters. LUT 88 may allow central processor 80 to look up the result of calculations without having to expend processing resources and power performing the calculations themselves. As an example, central processor 80 may generate, based on angles of the RIS beams identified by control signal CBE, a base value for the phase settings for each set 82 of antenna elements 48, which may include a delta phase offset between adjacent antenna elements 48 (e.g., for inclusion in intermediate values PSIV). Central processor 80 may transmit intermediate values PSIV to local processors 84 over control paths 86.

Local processors 84 may complete the calculation of phase settings based on intermediate values PSIV received from central processor 80 (e.g., local processors 84 may calculate/compute a third and final portion of the phase settings). As shown in FIG. 4, each local processor 84 may generate a set of phase settings PS (e.g., a set of K phase settings, one for each of the K antenna elements 48 in the set 82 coupled to that local processor 84). For example, the local processor 84 for set 82-1 may generate a first set of phase settings PS1, the local processor 84 for set 82-2 may generate a second set of phase settings PS2, the local processor 84 for set 82-L may generate an Lth set of phase settings PSL, etc.). Each local processor 84 may distribute the phase settings from the set of phase shift settings PS that it calculated to the phase shifters 74 (FIG. 3) of the antenna elements 48 in its set 82 (e.g., each phase shifter may receive a respective phase setting from the set of phase settings PS). When configured with the sets of phase settings, the array of antenna elements 48 may effectively form the RIS beams and may reflect wireless signals 46 in the directions specified by AP 34 and control signals CBE.

Figure 5:
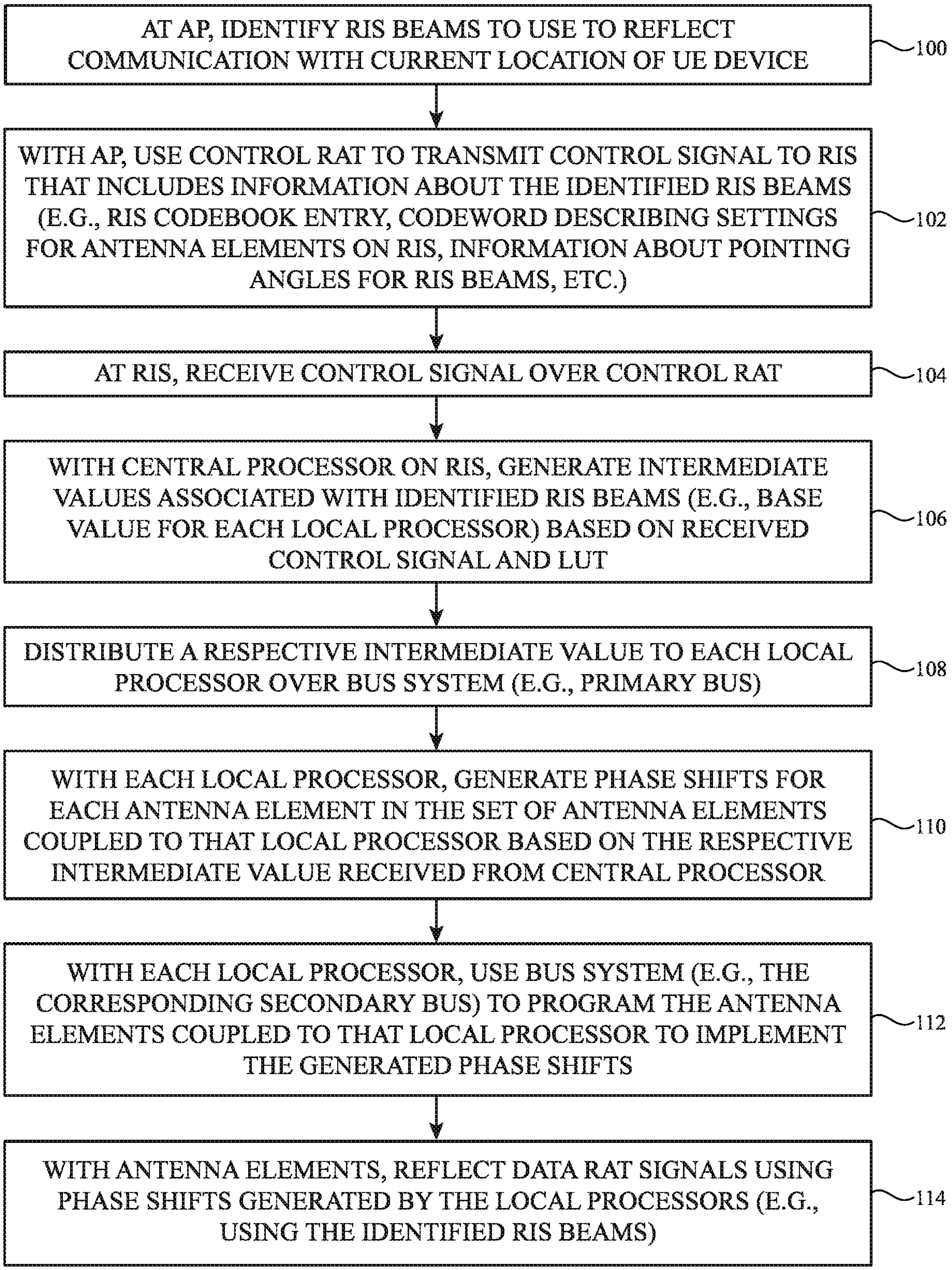
FIG. 5 is a flow chart of illustrative operations involved in dividing programming responsibilities for sets of antenna elements on a RIS between a wireless access point, a central processor on the RIS, and local processors on the RIS in accordance with some embodiments.

FIG. 5 is a flow chart showing how RIS 50 may be operated while splitting responsibility for generating phase settings for antenna elements 48 between RIS 50 and AP 34. At operation 100, AP 34 may select (e.g., identify, calculate, generate, compute, etc.) first and second RIS beams (e.g., a RIS-AP beam and corresponding RIS-UE beam) for RIS 50 to use in reflecting wireless signals 46 between AP 34 and UE device 10. AP 34 may, for example, select the RIS beams based on the tracked location of UE device 10, data RAT channel measurements, and/or feedback signals or other control signals received from the UE device. AP 34 may generate (e.g., calculate, compute, output, produce, etc.) a codebook entry for RIS 50 corresponding to the selected RIS beams, a portion of the codebook entry (e.g., a reduced codebook entry with a corresponding parameter range), information identifying the orientation/angle of the selected RIS beams (which may itself form part of the codebook entry for the selected RIS beams), a codeword describing phase settings for phase shifters 74 or other antenna settings for antenna elements 48, and/or any other desired calculation results.

At operation 102, AP 34 may use the control RAT to transmit control signal CBE to RIS 50. Control signal CBE may include or identify the calculation results associated with the selected RIS beams (e.g., the first portion of the phase settings for RIS 50 as produced by AP 34 while processing operation 100).

At operation 104, RIS 50 may receive control signal CBE using the control RAT and antenna 78 of FIG. 3.

At operation 106, central processor 80 may generate intermediate values PSIV associated with the selected RIS beams based on the received control signal CBE and LUT 88. Central processor 80 may, for example, generate a different respective intermediate value PSIV for each local processor 80. This may include, for example, generating a base value for the phase shifts produced for each set 82 of antenna elements 48, which may include a delta phase offset between adjacent antenna elements 48 in that set.

At operation 108, central processor 80 may distribute each intermediate values PSIV to its corresponding local processor 80 over a first portion of a bus system on RIS 50 such as control paths 86 (e.g., a primary bus).

At operation 110, each local processor 84 may generate a different respective set of phase settings PS for the antenna elements 48 coupled to that local processor 84, based on intermediate values PSIV. Each set of phase settings PS may, for example, include a respective phase setting/configuration for each of the phase shifters 74 in the corresponding set 82. This may include, for example, calculating each phase setting based on the base value for that local processor 84 as included in the corresponding intermediate value PSIV received from controller 80.

At operation 112, each local processor 84 may distribute each phase setting from its respective set of phase settings PS to its corresponding antenna element 48 over a second portion of the bus system on RIS 50, such as control paths 92 (e.g., a secondary bus). This may cause the antenna elements to implement the corresponding phase setting as calculated collectively by AP 34, central processor 80, and local processor 84. If desired, the distribution and implementation of the phase settings may be split into two different operations (e.g., using a trigger register). Each phase setting may serve to program (configure) the phase shifter 74 to produce the corresponding phase shift for antenna element 48 (e.g., upon incident/reflected signals). This may serve to configure all of the antenna elements 48 to form the first and second RIS beams as selected by AP 34.

At operation 114, AP 34 and UE device 10 may convey wireless signals 46 via reflection off RIS 50. Antenna elements 48 may reflect wireless signals 46 using the phase settings output by local processors 84 (e.g., within the selected RIS beams, from incident angles as identified by AP 34 onto corresponding output angles as identified by AP 34). The operations of FIG. 5 may be repeated over time to update the RIS beams formed by RIS 50 as necessary (e.g., as UE device 10 moves, as UE device 10 leaves, as new UE devices join the system, as RIS 50 moves, etc.).

Dividing phase setting calculations for antenna elements 48 in this way may allow for much faster calculation and programming of the phase settings for antenna elements 48. This may serve to produce a much higher cadence for RIS adaptations (e.g., reconfigurations of antenna elements 48), due to the parallel implementation of local processors 84 and the reception of control signal CBE from AP 34. There may be a small increase in power consumption at RIS 50 relative to implementations where AP 34 performs all the calculations for the phase shifts for antenna elements 48. However, the overall power consumption of the AP and the RIS may even decrease, as the RIS may include hardware machines that are specifically tailored for generating phase shifts based on the information provided in control signal CBE, rather than including a multi-purpose CPU as implemented on the AP.

Figure 6:
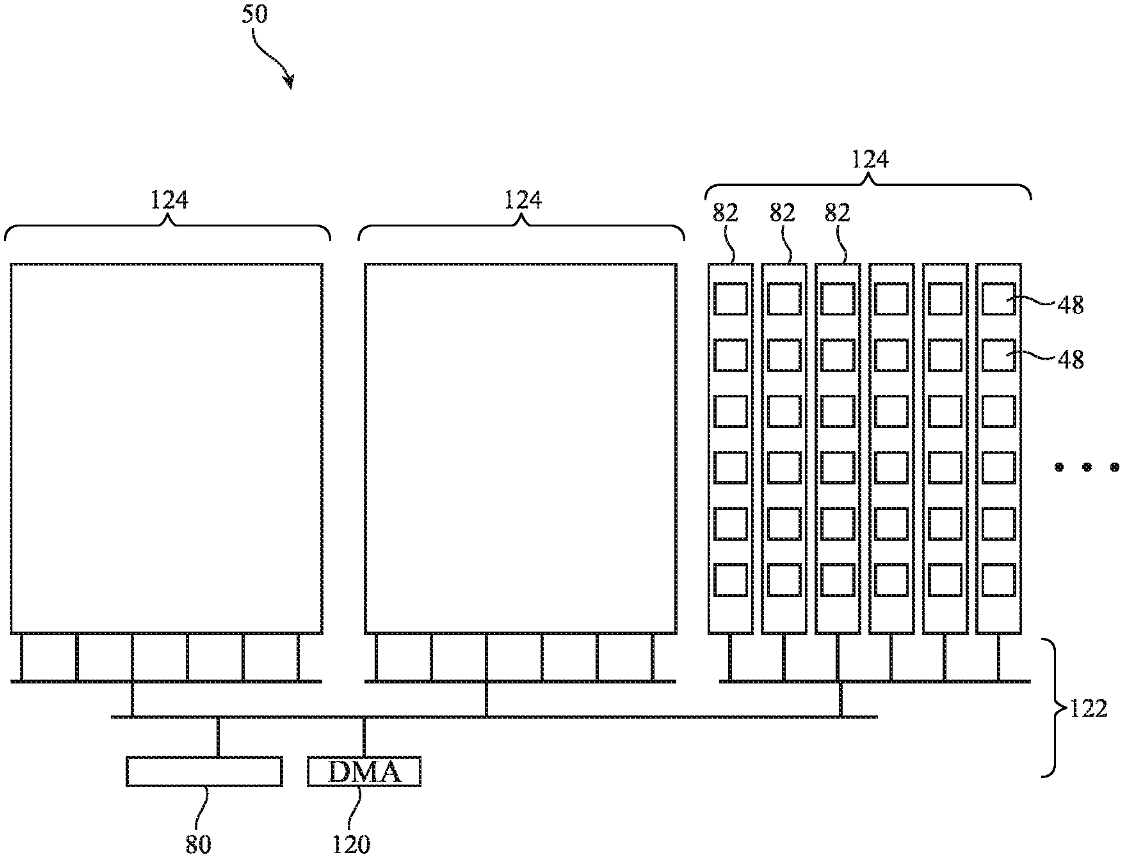
FIG. 6 is a diagram showing how an illustrative bus system may couple a central processor to different nodes of antenna elements on a RIS in accordance with some embodiments.

If desired, RIS 50 may include multiple nodes of antenna elements 48, where each node includes multiple sets 82. FIG. 6 is a diagram showing one example of how RIS 50 may include multiple nodes of antenna elements 48, where each node includes multiple sets 82. As shown in FIG. 6, RIS 50 may include bus system 122. Central processor 80 may be coupled to bus system 122. RIS 50 may include a direct media access (DMA) controller 120 coupled to bus system 122. Bus system 122 may, for example, include a cascaded set of buses such as a primary bus (e.g., including control paths 86 of FIG. 4) and a secondary bus (e.g., including control paths 92 of FIG. 4). The primary bus may, for example, couple DMA controller 120, central controller 80, and nodes 124 together. Behind each node, the secondary buses may be used to connect to other nodes. This setup may, for example, allow for the address of 100 columns (e.g., when there are 10 nodes 124 and each node has 10 sets 82). Each column (set 82) may be accessible via a node at the secondary bus. Bus system 122 may have a bus width of 32 bits, as one example.

RIS 50 may include a set of nodes 124. Each node 124 may include one or more sets 82 of antenna elements 48, each coupled to a corresponding local processor 84 of FIG. 4 (not shown in FIG. 6 for the sake of clarity). Central processor 80 may, for example, handle the basic extraction of phase differences from a codebook entry (e.g., from control signal CBE) and may generate intermediate values PSIV of FIG. 4 based on control signal CBE. DMA controller 120 may be programmed by central processor 80 and may be used to send intermediate values PSIV to local processors 84 (e.g., DMA controller 120 may serve to decouple central processor 80 from the shuffling of data performed by the local processors).

Figure 7:
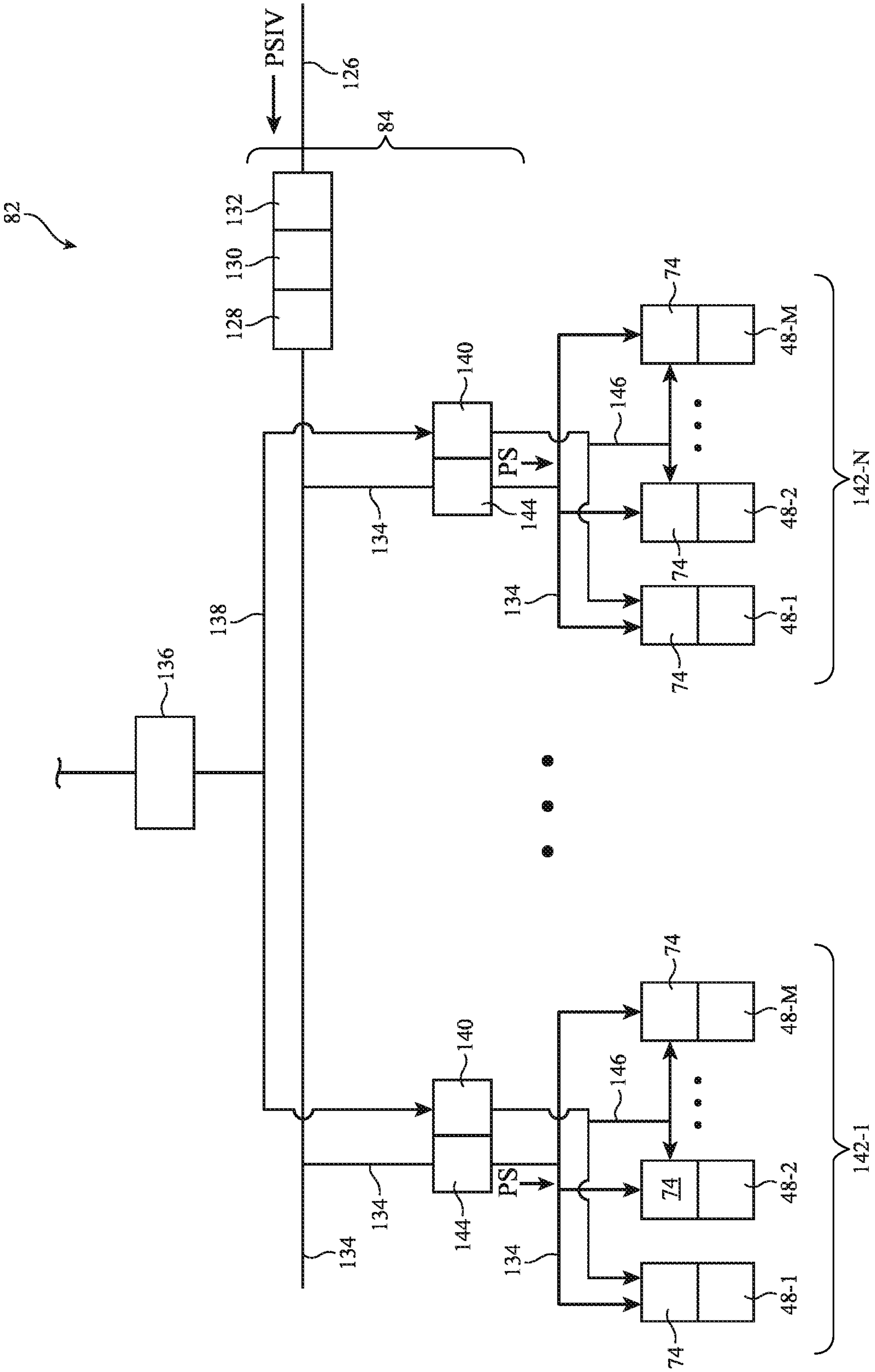
FIG. 7 is a circuit diagram showing how an illustrative local processor may generate phase settings for a corresponding set of antenna elements in accordance with some embodiments.

Each set 82 of antenna elements 48 may form a final stage in the calculation of phase shifts for antenna elements 48. FIG. 7 is a circuit diagram of an illustrative set (final stage) 82 from a corresponding node 124. As shown in FIG. 7, final stage 82 may include processing blocks 128, 130, 132, 144, and 140, which collectively form the local processor 84 for that final stage 82. Processing blocks 128, 130, and 132 may be coupled to a first portion of bus system 122 such as primary bus 126. The input of processing block 132 may receive intermediate values PSIV from central controller 80 over primary bus 126.

Final stage 82 may include up to N different subsets, sub-blocks, or groups 142 of antenna elements 48. Each group 142 may include M antenna elements 48, each having a respective phase shifter 74. Each group 142 may have a corresponding processing block 144 and a corresponding processing block 140. The output of processing block 128 may be coupled to the input of processing blocks 144 and 140 over a second portion of bus system 122 such as secondary bus 134. Secondary bus 134 may also couple the output of processing blocks 144 to the M antenna elements 48 in its corresponding group 142. Final stage 82 may also include a trigger register 136. The output of trigger register 136 may be coupled to the input of processing blocks 140. The output of each processing block 140 may be coupled to the phase shifters 74 in the corresponding subset 142 over trigger paths 146. If desired, antenna elements 48, phase shifters 74, and the local processing blocks may be constructed using the same fabrication process to avoid additional physical interfaces between dies and to allow for synchronous clocking.

Processing blocks 132, 130, 128, and 140 may generate the set of phase settings PS for the M×N antenna elements 48 in final stage 82. Processing blocks 132, 130, 128, and 140 may, for example, include or form a hardware state machine that generates phase settings PS based on intermediate values PSIV (e.g., a control word or control words generated by central controller 80). The hardware state machine may distribute, over secondary bus 134, the respective phase setting for each corresponding phase shifter 74 to that phase shifter, thereby configuring the phase shifter to impart its corresponding phase shift to incident/reflected wireless signals 46.

As one example, processing block 132 may include a buffer, processing block 130 may include calculation logic, processing block 128 may include an access subregister, processing blocks 144 may include control registers, and processing blocks 140 may include trigger signal distributors. Processing block 132 may, for example, add a respective phase offset for each antenna element in final stage 82 based on the intermediate values PSIV received from central processor 80 (e.g., each antenna element may be offset in phase from the previous antenna element in final stage 82 by the same phase offset, sometimes referred to herein as a delta phase offset). Processing block 130 may generate the phase setting for each antenna element 48 based on the added phase offset and based on intermediate values PSIV. Processing block 128 may transmit the generated phase settings to processing blocks 144 (e.g., control registers) over secondary bus 134 (e.g., processing block 128 may shuffle the bits identifying the phase settings into the control registers one-by-one).

Each processing block 144 may store the phase settings received from processing block 128 and may, upon command from the trigger register, distribute the phase settings to the corresponding phase shifters 74 in its group of M antenna elements 48. For example, after the phase settings are written to processing blocks 144, trigger register 136 may be used to activate the phase settings stored on processing blocks 144. For example, when the RIS beams are to be changed, trigger register 136 may distribute a trigger signal to trigger distributors 140 over trigger path 138 and trigger distributors 140 may transmit the trigger signals to phase shifters 74 over trigger paths 146. The trigger signals may control each processing block 144 to transmit the phase settings to its phase shifters 74 and may control the phase shifters to be re-programmed using the corresponding phase setting transmitted by processing block 144. In other words, the trigger register may serve to (when set) push the phase settings stored on processing blocks 144 onto phase shifters 74.

Phase shifters 74 may include 8-bit phase shifters (e.g., where 8 bits are used to specify the phase setting for each phase shifter), 2-bit phase shifters (e.g., where 2 bits are used to specify the phase setting for each phase shifter), or phase shifters of any other desired size. In implementations where phase shifters 74 are 8-bit phase shifters, processing blocks 144 may be 64-bit registers, processing block 130 may perform 64-bit calculations, and processing block 132 may be a 32-bit buffer (e.g., 16 bits for line A and 16 bits for row B), for example.

Figure 8:
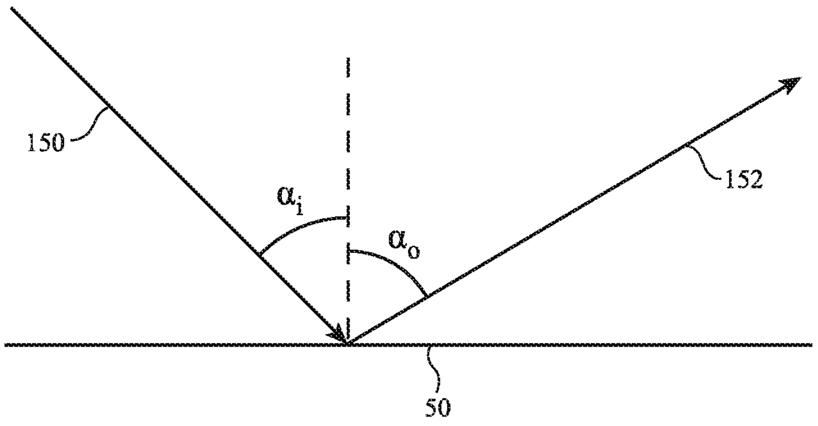
FIG. 8 is a diagram showing how signals reflected by a RIS may be characterized by an incident angle and an output angle in accordance with some embodiments.

In some implementations, AP 34 may select the RIS beams for RIS 50 (e.g., at operation 100 of FIG. 5) and may include information identifying the angles/orientations of the selected RIS beams in control signal CBE. For example, as shown in FIG. 8, the selected RIS beams may include a first RIS beam facing incident signals 150 (e.g., an input vector) and a second RIS beam oriented in the direction of reflected signals 152 (e.g., an output vector). The incident signals 150 may be incident at an incident angle $\alpha_i$. The reflected signals 152 may be at an output (reflected) angle $\alpha_o$. The example of FIG. 8 shows only a single degree of freedom for the sake of clarity. In general, incident angle $\alpha_i$ may be written in polar coordinates as $(\theta_i,\varphi_i)$ and output angle $\alpha_o$ may be written in polar coordinates as $(\theta_o,\varphi_o)$. AP 34 may calculate the angles (orientations) of the selected RIS beams (e.g., $(\theta_i,\varphi_i)$ and $(\theta_o,\varphi_o)$) and may transmit the calculated angles of the selected RIS beams (or vectors corresponding to incident signals 150 and reflected signals 152) to RIS 50 in control signal CBE (e.g., using one or more codewords).

Central controller 80 may generate, based on the angles (orientations) of the selected RIS beams as included in control signal CBE (e.g., $(\theta_i,\varphi_i)$ and $(\theta_o,\varphi_o)$), an intermediate value PSIV for each final stage 82 that includes a base value with a delta phase offset value for the antenna elements 48 in that final stage 82. The local processor 84 for the final stage 82 may then generate phase settings PS based on the base value and the delta phase offset value generated for that final stage 82 by central controller 80 (e.g., as included in intermediate value PSIV).

Figure 9:
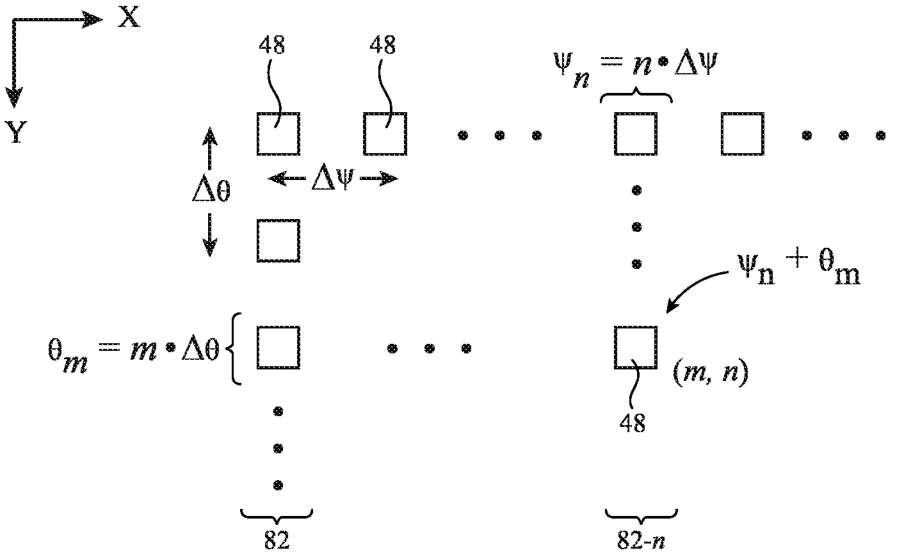
FIG. 9 is a diagram showing how first and second phase offsets may be generated for a given antenna element on a RIS for reflecting signals from an incident angle onto an output angle in accordance with some embodiments.

FIG. 9 is a diagram showing how phase settings may be generated based on delta phase offset values. As shown in FIG. 9, antenna elements 48 may be arranged in a rectangular grid pattern having rows indexed by integer m and columns (e.g., sets or final stages 82) indexed by integer n. The spacing of each antenna element 48 is such that each antenna element 48 in a given row has a phase setting that is offset from the one or two adjacent antenna element(s) in that row by first delta phase offset value $\Delta\psi$ and such that each antenna element 48 in a given column has a phase setting that is offset from the one or two adjacent antenna element(s) in that column by second delta phase offset value $\Delta\theta$. As such, the phase setting for the antenna elements in an mth row may be equal to $\theta_m=m*\Delta\theta$. Similarly, the phase setting for the antenna elements in an nth column may be equal to $\psi_n=n*\Delta\psi$. The phase setting for an antenna element at position (m,n) (e.g., in the mth row and nth column) may be equal to the sum of both phase settings, or $\theta_m+\psi_n=m*\Delta\theta+n*\Delta\psi$.

While processing operation 106 of FIG. 5, central processor 80 may calculate (e.g., compute, generate, output, produce, etc.) delta phase offsets $\Delta\psi$ and $\Delta\theta$ based on the angles $(\theta_i,\varphi_i)$ and $(\theta_o,\varphi_o)$ computed by AP 34 and identified in control signal 34. Central processor 80 may, for example, identify (e.g., produce, output, generate, compute, retrieve, etc.) $\sin(\theta_o)$, $\sin(\theta_i)$, $\cos(\theta_o$, and $\cos(\theta_i)$ to compute delta phase offsets $\Delta\psi$ and $\Delta\theta$. These trigonometric quantities may, if desired, be pre-calculated and stored on LUT 88 and then retrieved as needed by central processor 80, thereby minimizing the amount of resources required to operate central processor 80. LUT 88 itself may still remain very small. As an example, for a 120-degree field of view with a 1 degree resolution, the LUT may only need to include 120 entries*2 at 32-bit, where the 32-bit value covers the range from [−1,1]. This may lead, for example, to an overall storage size of 960 bytes on LUT 88.

Once central processor 80 has calculated delta phase offsets $\Delta\psi$ and $\Delta\theta$, central processor 80 may then calculate a base value that is equal to $n*\Delta\theta+\Delta\psi$ for each final stage 82 (e.g., where n is the index or column number of that final stage). Central processor 80 may include the corresponding base value for each final stage in the intermediate value PSIV transmitted to that final stage (e.g., at operation 108 of FIG. 5). If desired, beamwidth or shape may also be an input parameter to central controller 80, which might be required to perform hierarchical beam sweeps. Broader or differently shaped beams may be realized using a combination of several phase offsets for subsets of elements or using fewer elements (e.g., setting a subset of elements to random values).

Processing block 132 in each final stage 82 may receive, over primary bus 126, its corresponding intermediate value PSIV and thus its corresponding base value $n*\Delta\theta+\Delta\psi$. At operation 110 of FIG. 5, processing block 130 may generate the phase setting for each antenna element 48 in its corresponding final stage 82 based on the received base value $n*\Delta\theta+\Delta\psi$. Processing block 130 may, for example, add the appropriate multiple of delta phase offset value $\Delta\psi$ for each antenna element 48 in the final stage (e.g., based on the position of that antenna element in the array) to generate the phase setting for that antenna element. In other words, the local processor 84 for a given final stage 82 may receive a starting value for the offset of the first phase shifter in its column of antenna elements 48 as well as delta phase offset value $\Delta\psi$ and may calculate, based on these values, the corresponding phase setting for each phase shifter 74 in the final stage. Processing block 128 may load the phase shift settings onto processing blocks 144. Processing blocks 144 may configure (program) phase shifters 74 using the corresponding phase settings when triggered by trigger register 136 (e.g., at operation 112 of FIG. 5).

Distributing calculation of the phase settings for antenna elements 48 in this way may serve to minimize the time required to configure or reconfigure RIS 50. For example, when phase shifters 74 are 8-bit phase shifters (e.g., each phase shift setting is specified by a corresponding 8-bit value), the duration from receiving control signal CBE (e.g., the control word) and applying it to antenna elements 48 may be on the order of 10 micro-seconds. Even with a low bus and processor speed of 100 MHz (as an example), the cadence for applying a new RIS configuration may be as fast as several 100 kHz. When higher frequencies are used, a 1-10 MHz reconfiguration speed may be met.

This may be significantly faster than performing all computations on RIS 50. For example, when RIS 50 performs all computations, a single phase setting is calculated per clock cycle (e.g., assuming no vector handling). Thus, roughly 10,000 cycles are required for creation of all phase settings (e.g., when RIS 50 includes 10,000 antenna elements 48). The combination of 8 values into a 64-bit word may require one cycle, for a total of 1250 additional cycles. Distribution is performed via a 64-bit bus system, such that overall transfer requires 312 cycles. This yields approximately 11250 cycles for setting a single RIS configuration, which is equivalent to approximately 110 micro-seconds, which is much slower than distributing the calculations as described herein. Further, performing all calculations on AP 34 may require several hundred micro-seconds for each RIS reconfiguration, while also adding power consumption for the longer activity of the control interface between AP 34 and RIS 50.

The examples described herein are illustrative and non-limiting. UE device 10 may perform any of the operations of AP 34 as described herein. The interface may be extended from sending a single codebook entry from AP 34 to RIS 50 to instead sending a range of entries. Additional procedures may be used. RIS 50 may, if desired, autonomously sweep through geometric neighbors of a given codebook entry. And/or through a set of given codebook entries.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent with." While described herein as redirecting wireless signals via reflection for the sake of simplicity, RIS 50 may equivalently redirect wireless signals via transmission (e.g., by transmitting the signals through the RIS onto a desired output angle that is adjusted by adjusting the impedance responses of the antenna elements on the RIS).

UE device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods and operations described above in connection with FIGS. 1-7 may be performed by the components of UE device 10, RIS 50, and/or AP 34 using software, firmware, and/or hardware (e.g., dedicated circuitry or hardware). Software code for performing these operations may be stored on non-transitory computer readable storage media (e.g., tangible computer readable storage media) stored on one or more of the components of UE device 10, RIS 50, and/or AP 34. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of UE device 10, RIS 50, and/or AP 34. The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A first electronic device configured to redirect wireless signals between a second electronic device and a third electronic device, the first electronic device comprising:

first phase shifters coupled to a first set of antenna elements;

second phase shifters coupled to a second set of antenna elements;

a first processor configured to generate a first value and a second value;

a bus system;

a second processor coupled to the first processor and the first phase shifters over the bus system, the second processor being configured to set the first phase shifters using first phase settings that are based on the first value, wherein the first electronic device is configured to redirect the wireless signals while the first phase shifters are configured using the first phase settings; and a third processor coupled to the first processor and the second phase shifters over the bus system, the third processor being configured to set the second phase shifters using second phase settings that are based on the second value.

2. The first electronic device of claim 1, further comprising:

an antenna configured to receive a control signal from the second electronic device, wherein the first processor is configured to generate the first value based on the control signal.

3. The first electronic device of claim 2, the first processor being configured to generate the second value based on the control signal.

4. The first electronic device of claim 3, wherein the control signal identifies a first angle and a second angle associated with signal beams formable by the first and second sets of antenna elements, the first processor being configured to generate the first value based on the first angle, the second angle, and a geometry of the first set of antenna elements, and the first processor being configured to generate the second value based on the first angle, the second angle, and a geometry the second set of antenna elements.

5. The first electronic device of claim 3, wherein the first value includes a first phase offset and the second value includes a second phase offset, the second processor being configured to generate the first phase settings based on the first phase offset, and the third processor being configured to generate the second phase settings based on the second phase offset.

6. The first electronic device of claim 1, wherein the first processor comprises a digital signal processor and the second processor comprises a hardware state machine.

7. The first electronic device of claim 1, wherein the second processor comprises:

a buffer configured to receive the first value;

calculation logic configured to generate the first phase settings based on the first value received by the buffer;

a first register; and a second register, the first register being configured to load at least a portion of the first phase settings into the second register.

8. The first electronic device of claim 7, further comprising:

a trigger register configured to control the second register to set the first phase shifters using the first phase settings.

9. The first electronic device of claim 7, wherein the second register is coupled to a first subset of the first phase shifters, the first electronic device further comprising:

a third register coupled to a second subset of the first phase shifters, the third register being configured to load an additional portion of the first phase settings into the third register.

10. The first electronic device of claim 9, wherein the bus system comprises:

a first bus that couples the first processor to the second processor; and a second bus that couples the first register to the second register and that couples the first register to the third register.

11. The first electronic device of claim 7, wherein the first value comprises a phase offset value and a base value, the calculation logic being configured to generate the first phase settings by adding multiples of the offset value to the base value.

12. Wireless circuitry comprising:

phase shifters configured to be coupled to a set of antenna elements and configured to control the set of antenna elements to redirect wireless signals between a first electronic device and a second electronic device while the phase shifters implement phase settings;

a first set of one or more processors configured to generate a value;

a bus system; and a second set of one or more processors communicatively coupled to the first set of one or more processors and the phase shifters over the bus system, wherein the second set of one or more processors is configured to set the phase shifters to implement the phase settings based on the value, the second set of one or more processors includes a first register, a second register communicatively coupled to a first subset of the phase shifters, and a third register communicatively coupled to a second subset of the phase shifters, the first register is configured to load a first subset of the phase settings onto the second register, and the first register is configured to load a second subset of the phase settings onto the third register.

13. The wireless circuitry of claim 12, further comprising:

an antenna configured to receive a control signal from the second electronic device, the first set of one or more processors being configured to generate the value based on the control signal.

14. The wireless circuitry of claim 12, wherein the first set of one or more processors comprises a digital signal processor.

15. The wireless circuitry of claim 12, wherein the second set of one or more processors further comprises:

a buffer configured to receive the value; and calculation logic configured to generate the phase settings based on the value received by the buffer.

16. The wireless circuitry of claim 15, further comprising:

a trigger register configured to control the second register to configure the first subset of the phase shifters using the first subset of the phase settings.

17. The wireless circuitry of claim 12, wherein the bus system comprises:

a first bus that communicatively couples the first set of one or more processors to the second set of one or more processors; and a second bus that communicatively couples the first register to the second register and that communicatively couples the first register to the third register.

18. The wireless circuitry of claim 12, wherein the value comprises a phase offset value and a base value, the phase settings being generated, by the second set of one or more processors, by adding multiples of the offset value to the base value.

19. A method of operating a first electronic device to redirect wireless signals between a second electronic device and a third electronic device, the method comprising:

outputting, using a first processor, a value;

outputting, using a second processor, phase settings based on the value;

storing, at a first register, the phase settings;

storing, at a second register communicatively coupled to a first set of phase shifters, a first subset of the phase settings;

storing, at a third register communicatively coupled to a second set of phase shifters, a second subset of the phase settings; and redirecting the wireless signals while the first set of phase shifters implement the first subset of the phase settings and the second set of phase shifters implement the second subset of the phase settings.

20. The method of claim 19, further comprising:

transmitting, using a first bus, the value from the first processor to the second processor;

transmitting, using a second bus, the first subset of the phase settings from the first register to the second register;

transmitting, using the second bus, the second subset of the phase settings from the first register to the third register;

loading, using a third bus, the first subset of the phase settings onto the first set of phase shifters; and loading, using a fourth bus, the second subset of the phase settings onto the second set of phase shifters.

* * * * *